United States Patent [19]

Grape et al.

[11] Patent Number: 4,554,187

[45] Date of Patent: Nov. 19, 1985

[54] STABLE SILICONE EMULSIONS

[75] Inventors: Wolfgang Grape; Franz Saykowski, both of Cologne; Ottfried Schlak; Thomas Würminghausen, both of Leverkusen, all of Fed. Rep. of Germany

[73] Assignee: Bayer Aktiengesellschaft, Leverkusen, Fed. Rep. of Germany

[21] Appl. No.: 622,936

[22] Filed: Jun. 21, 1984

[30] Foreign Application Priority Data

Jul. 2, 1983 [DE] Fed. Rep. of Germany ....... 3323909

[51] Int. Cl.$^4$ ............................................. B05D 3/02
[52] U.S. Cl. .................................. 427/387; 156/329; 524/588; 524/860; 525/477
[58] Field of Search ............... 524/588, 860; 525/477; 427/387; 156/329

[56] References Cited

U.S. PATENT DOCUMENTS 4,277,382  7/1981  Lin et al.
4,288,356  9/1981  Huebner et al. .................... 524/506

FOREIGN PATENT DOCUMENTS 3219220  11/1983  Fed. Rep. of Germany.
2056573   3/1981  United Kingdom.

*Primary Examiner*—Melvyn I. Marquis
*Attorney, Agent, or Firm*—Sprung Horn Kramer & Woods

[57] ABSTRACT

A silicone emulsion which can be converted into an elastomeric product under ambient conditions by eliminating and evaporating water and alcohol or carboxylic acid, comprising by weight approximately (A) 100 parts of a hydroxyl-terminated polydiorganosiloxane having a molecular weight of at least about 50,000,
(B) 1 to 400 parts of a low molecular weight, reactive acyloxy or alkoxy-functional silicone resin,
(C) 0.1 to 20 parts of a catalytic compound,
(D) 0 to 200 parts of a thixotropic filler and
(E) 0 to 200 parts by weight of a non-thixotropic filler, the silicone emulsion having a solids content of about 20 to 85% by weight. The emulsion is especially suited for coatings and sealants.

10 Claims, No Drawings

STABLE SILICONE EMULSIONS

The present invention relates to stable aqueous silicone emulsions which, after removal of the water under ambient conditions, yield an elastomeric product.

Emulsions of organopolysiloxanes have already been known for a number of years. The emulsions are used as mold-release agents, paints, agents for treating fibers and woven and knitted fabrics, anti-foaming agents and gloss products.

The processes for preparing these emulsions are generally known; refer to U.S. Pat. No. 2,891,920 for an example. There it is regarded as one of the problems in the silicone field that there is no good method for preparing stable emulsions of extremely high molecular weight siloxanes. However, it is virtually a precondition for the formation of protective coatings that the siloxane used exceeds a certain molecular weight limit. Polysiloxanes having such a high molecular weight cannot be converted into stable emulsions by normal emulsifying methods. Accordingly, to date there are virtually no siloxane emulsions for producing protective coatings. The abovementioned U.S. patent specification primarily concerns a method for polymerizing siloxanes in the emulsified state using strong mineral acids or strong alkaline catalysts which are capable of rearranging siloxane bonds.

This method makes it possible to carry out such an emulsion polymerization in the presence of cationic, nonionic or anionic dispersants, the anionic emulsifying agents being used for acid catalysts and the nonionic emulsifying agents both for acid and alkaline catalysts. The emulsions which are obtained using this method are said to be extremely stable and to be storable for years without separating. According to this U.S. patent specification, the emulsions are suitable for use as release agents and coating compositions as well as additives in emulsion paints. However, these emulsions described in U.S. Pat. No. 2,891,920 have a crucial disadvantage in that the emulsions described in the examples are pure emulsions of hydroxyl-terminated high molecular weight siloxanes which, after removal of the water, therefore cannot harden into a stable resilient elastomeric coating composition. The preparation of such an elastomeric coating composition requires a reinforcing or crosslinking component. The coatings prepared in accordance with the abovementioned U.S. patent specification therefore naturally lack adequate physical strength and adequate adhesion.

In the process according to British Patent Specification No. 1,024,024, an organosiloxane emulsified in water by means of an alkylbenzenesulphonic acid is polymerized by heating. In this process, the alkylbenzenesulphonic acid serves, at the same time, as emulsifier and as catalyst of the polymerization carried out in the process. The abovementioned British patent specification also gives a process in which the emulsion polymerization is carried out in the presence of small amounts of alkoxysilanes, such as methyltrimethoxysilane, methyltriethoxysilane, vinyltrimethoxysilane and phenyltrimethoxysilane.

German Offenlegungsschrift (German Published Specification) No. 2,720,457 describes a silicone composition which can be used as a binder for preparing sealing and packing material. The silicone composition consists of an $\alpha,\omega$-dihydroxydiorganopolysiloxane having a viscosity of at least 100 m Pas at 25°, substantially comparable amounts of a silane of the general formula R Si(OR')$_3$, an organometal catalyst, an emulsifying agent and water. The binder described in this German Offenlegungsschrift can be used not only directly in the form of an emulsion but also in the form of an emulsion to which organic solvents have been added. However, no statement is made about the stability of an emulsion containing the abovementioned components.

U.S. Pat. No. 3,355,406 describes silicone latexes which consist of a long-chain hydroxyl-terminated silicone oil and a reinforcing silicone resin. In this case, the silicone resin used has evidently been already fully hardened, so that it is unlikely that the resin will react with the silicone oil to form a homogeneous elastomeric coating composition.

German Offenlegungsschrift (German Published Specification) No. 2,912,431 describes an organopolysiloxane latex in the preparation of which, by emulsion polymerization of a cyclic organosiloxane to give an OH—terminated long-chain silicone oil, an organofunctional trialkoxysilane is added even before the polymerization. It is stated that adding this last-mentioned component after the emulsion polymerization has taken place generally does not lead to the desired adhesion and bonding on substrates if the latex is used as a protective coating. The amount of organofunctional trialkoxysilane is 0.1 to 30 parts by weight, preferably 1 to 15 parts by weight, relative to 100 parts by weight of the linear organopolysiloxane. If the amount of alkoxysilane is too low, the adhesion is impaired, and if the amount is larger than stated, the stability of the emulsion is reduced by the alcohol formed on hydrolysis of the alkoxy groups. This accordingly does not produce a stable, storable emulsion which contains comparable amounts of resin and polymer. German Offenlegungsschrift (German Published Specification) No. 3,019,655 describes a silicone emulsion which, after removal of the water, can be converted into an elastomeric product under ambient conditions and which is characterized by an addition of 1 to 150 parts by weight of amorphous silica, relative to 100 parts by weight of a hydroxyl-terminated polydiorganosiloxane in emulsion form. According to the abovementioned German Offenlegungsschrift, the incorporated silica has the effect that this silicone emulsion produces a hardened film on drying. A serious problem in the preparation of such reinforced silicone emulsions is the incorporation of the amorphous silica in the emulsion of the hydroxyl-terminated silicone oil. In order to be able to ensure that the SiO$_2$ is incorporated homogeneously, the procedure according to German Offenlegungsschrift (German Published Specification) No. 3,019,655 is to mix a colloidal dispersion of the SiO$_2$ with the emulsion of the silicone oil. Such colloidal dispersions of silica are not especially stable, so that the pH of a mixture is a critical quantity. Moreover, there is a danger that, as a result of deficient bonding of the SiO$_2$ to the OH—terminated silicone oil, the hardened coating composition becomes inhomogeneous itself.

German Patent Specification No. 2,943,832 describes a silicone emulsion which differs from German Offenlegungsschrift (German Published Specification) No. 3,019,655, just mentioned, only by a higher solids content. Adding an amorphous silica to an emulsion of an OH—terminated long-chain silicone oil having a solids content greater than 60% produces a stable emulsion which can be used as a grouting composition. A disadvantage of the patent specification in question is that the finished emulsion is stable only at a pH above 9, so that, since the pH is set with an amine, odor nuisance arises. Moreover, the test results described in German Auslegeschrift (German Published Specification) No. 2,943,832 on the films prepared in the examples indicate that it is an essentially uncrosslinked material with few resilient properties.

It is therefore an object of the present invention to provide a stable silicone emulsion which can be converted into an elastomeric product.

The present invention accordingly provides a silicone emulsion which can be converted into an elastomeric product under ambient conditions by eliminating and evaporating water and alcohol and which is characterized by the following components:

(A) 100 parts by weight of an essentially linear hydroxyl-terminated polydiorganosiloxane having a molecular weight of above 50,000, (B) 1–400 parts by weight of a low molecular weight, reactive acyloxy or alkoxy-functional silicone resin, the alkoxy functionality being preferred, and (C) 0.1–20 parts by weight of a catalytic compound, preferably of an alkyltin salt, (D) 0–200 parts by weight of a thixotropic filler and (E) 0–200 parts by weight of other, non-thixotropic fillers, the silicone emulsion having a solids content of 20–85% by weight.

If the water is removed under ambient conditions, the alkoxy groups of the resin presumably react with the terminal OH groups of the silicone polymer under the action of a catalyst, so that an elastomeric coating composition remains. Depending on the ratio of resin to polymer, the desired spectrum of properties can be varied over a broad range. Increasing the resin content leads to an increasingly rigid coating composition having a short elongation at break, a high modulus of elasticity and a high tensile strength and being suitable, for example, for coatings even of surfaces which might be walked on. A low resin content leads to coating compositions which have a long elongation at break, a low modulus and a low tensile strength and which—after fillers have been added and they have become non-flowing, possibly by concentrating—can be used as sealants. It should thus be considered one of the main advantages of the invention that a broad application spectrum is covered by varying the mixing ratios of the two main components relative to each other. This is achieved by mixing two separately prepared silicone emulsions which are each stable by themselves, in a mixing ratio which is extremely variable. It is advantageous to add to these two silicone emulsions to be mixed an emulsion of a catalyst, for example of an alkyltin salt. However, it is also possible to add the hardening catalyst not until directly before the application.

It must be regarded as surprising that it is possible to turn low molecular weight alkoxy-functional silicone resins, as are used according to the invention, into stable emulsions which are so stable that they even survive, without separating or decomposing, an admixing with emulsions of long-chain OH—terminated silicone oils.

The preparation of an emulsion of a long-chain OH—terminated silicone oil by emulsion polymerization will, in principle, be familiar to a person skilled in the art. Refer, for example, to U.S. Pat. No. 2,891,910 and to British Patent Specification No. 1,024,024. The method of using an alkylbenzenesulphonic acid, which method is disclosed in the latter patent specification, is particularly preferred, since in this case the functions of emulsifier and polymerization catalyst are performed by one compound. When the polymerization has ended, the acid is neutralized so that afterwards the catalyst properties are blocked while the emulsifying properties are fully retained or, more likely, are improved. The concentration of emulsifying agent can accordingly be kept low, and, when the emulsion has been finished, there are no troublesome foreign molecules from the catalyst in the finished product. However, the alkylbenzenesulphonic acids mentioned can also be replaced by n-alkylsulphonic acids. It is also possible in addition to the catalytically active sulphonic acid to use other emulsifying agents as co-emulsifiers.

These co-emulsifiers can have a nonionic or an anionic nature. Possible anionic co-emulsifiers are in particular salts of the abovementioned n-alkylsulphonic or alkylbenzenesulphonic acids. Nonionic co-emulsifiers are polyoxyethylene derivates of fatty alcohols, fatty acids and the like. Examples of emulsifying agents of this type are POE (3) lauryl alcohol, POE (20) oleyl alcohol, POE (7) nonylphenol and POE (10) stearate (the notation of POE (3) lauryl alcohol indicates that 3 units of ethylene oxide have been added to one molecule of lauryl alcohol, the number 3 representing an average value). Nonionic emulsifying agents of this type would be known, in principle, to a person skilled in the art. The added co-emulsifiers, on the one hand, increase the stability of the emulsion resulting after the emulsion polymerization and, on the other hand, at the same time, however, have an effect on the chain length of the long-chain OH—terminated silicone oil produced in the course of the polymerization.

In general, silicone oils which are formed by emulsion polymerization in the presence of nonionic co-emulsifiers have a lower molecular weight than those where no co-emulsifier was used. The molecular weight of the OH—terminated silicone oil formed in the emulsion polymerization is furthermore controlled via the temperature at the equilibrization between siloxane, water and the silanol initially formed by ring-opening of the siloxane (for details concerning the relationship between temperature and molecular weight refer to the work by D. R. Weyenberg et al., J. Polymer Sci. Part C, 27 pp 27–34 (1969)).

The preparation of an emulsion of a long-chain OH—terminated silicone oil is particularly preferably done using the process described below. The monomer is octamethylcyclotetrasiloxane($D_4$) used in such an amount that the result is a 40% strength emulsion. The sulphonic acid acting as a catalyst in the emulsion polymerization is an n-alkylsulphonic acid. This sulphonic acid is used in an amount of 4%, relative to the amount of $D_4$. The co-emulsifiers used are the Na salt of the sulphonic acid used as catalyst, and POE (5) lauryl alcohol. The temperature during the emulsion polymerization is 60°, and triethanolamine is used for the neutralization.

The preparation of the alkoxy-functional silicone resins used is known and is done by reacting alkylchlorosilanes and/or arylchlorosilanes with alcohol and water (cf. for example British Patent Specification No. 685,173, German Patent Specification No. 958,702, French Patent Specification No. 1,475,709, U.S. Pat. No. 3,668,180, German Auslegeschrift (German Published specification) No. 2,061,189, German Offenlegungsschrift (German Published Specification) No. 2,444,529, German Auslegeschrift (German Published Specification) No. 2,532,887, European Patent Specification No. 3,610 or German Offenlegungsschrift (German Published Specification) No. 3,000,782).

The methyl-methoxy-silicone resin particularly preferred according to the invention is prepared by reacting methyltrichlorosilanes with methanol and water. If desired, it is also possible to use mixtures of methyltrichlorosilanes and other alkylchlorosilanes and/or arylchlorosilanes and/or tetrachlorosilane for preparing the alkoxy-functional silicone resins without any decrease in the stability of the emulsion according to the invention. Similarly, it is also possible to use, for the preparation of the resin, mixtures of various alcohols and/or for various alkoxy-functional silicone resins to be mixed with one another without thereby impairing the stability of the emulsion according to the invention. However, the spectrum of properties and the economics make it preferable to use methyltrichlorosilane and methanol for preparing the alkoxy-functional silicone resin.

The water-based emulsions of the silicone resins described above are prepared by using a combination of emulsifying agents. This combination is preferably a combination of two nonionic emulsifiers. Emulsifying agents of this type are polyoxyethylene derivatives of fatty alcohols, for example POE (4) lauryl alcohol, POE (10)cetyl alcohol, POE (20) stearyl alcohol, POE (2) oleyl alcohol, POE (20) oleyl alcohol and the like, polyoxyethylene derivatives of fatty acids, for example POE laurate, POE stearate, POE oleate and the like, polyoxyethylated sorbitan fatty acid esters, for example POE (20) sorbitan monolaurate, POE (70) monopalmitate, POE (4) monostearate, POE (20) sorbitan stearate, POE (5) sorbitan monooleate and the like, polyoxyethylene derivatives of polyhydric alcohols, for example POE triglyceride, polyoxyethylene derivatives of nonylphenol, for example POE (10) nonylphenol, POE (20) nonylphenol and the like, sorbitan fatty acid esters, for example sorbitan monolaurate, sorbitan tristearate and the like, and others.

The amount of emulsifying agents which is required for emulsifying 100 parts by weight of silicone resin in each case can vary within a wide range depending on the processing conditions and the choice of the remaining components of the emulsion. In the preparation according to the invention of emulsions of low molecular weight alkoxy-functional silicone resins, the amount of emulsifying agents which is required depends primarily on the alkoxy group content in the alkoxy-functional silicone resin. Moreover, an amount of emulsifier of 10 parts by weight, relative to 100 parts by weight of silicone resin, is generally sufficient for preparing a stable emulsion of a low molecular weight alkoxy-functional silicone resin. The use of a combination of nonionic emulsifying agents is particularly preferred; in particular, a combination of the nonionic emulsifying POE (40) triglyceride and POE (2) oleyl alcohol or a combination of the nonionic emulsifying agents POE (40) triglyceride and POE (6) tridecyl alcohol is used to prepare stable emulsions of low molecular weight alkoxy-functional silicone resins. However, it is also possible to use other combinations of nonionic emulsifying agents. These nonionic emulsifying agents will, in principle, be known to a person skilled in the art (cf. for example Stache, Tensidtaschenbuch [Surfactants Handbook], Hanser Verlag; and McCutchen's Detergents & Emulsifiers, North American Edition, 1979).

It is further possible to replace one of the two nonionic emulsifying agents used by either a cationic or an anionic emulsifying agent, and thus to use a combination of a nonionic emulsifying agent with a cationic or an anionic emulsifying agent.

Any emulsifying auxiliary familiar to a person skilled in the art can be used as emulsifying auxiliary. Thickening emulsifying auxiliaries are particularly preferred, and of these in particular the sodium salt of carboxymethylcellulose. However, it is also possible to use other emulsifying auxiliaries, such as, for example, relatively long-chain alcohols, polyvinyl alcohols, urea and so on. The addition of an emulsifying auxiliary of the type described is particularly preferred when emulsifying a low molecular weight alkoxy-functional silicone resin of high alkoxy content and low viscosity.

The methods (cf. for example E. Manegold, Emulsionen [Emulsions]; and P. Becher, Emulsions, Theory & Practice New York 1965, Chapter 7) for preparing emulsions will be likewise, in principle, familiar to a person skilled in the art. The order in which the components are added is generally not critical. Because of the hydrolysis sensitivity of the low molecular weight alkoxy-functional silicone resins, it is preferred to emulsify these resins by adding the alkoxy-functional resin to an aqueous solution containing the emulsifying agents and emulsifying auxiliaries. The use of mechanical emulsifying aids can likewise be desirable. These mechanical emulsifying aids include for example high-speed stirrers (Ultraturrax), and also pressure emulsifying machines and colloid mills (for example obtainable from Messrs. Manton-Gaulin).

The two emulsions separately prepared as described are mixed by simply stirring them together. The mixing ratio in which the two separately prepared emulsions are stirred together is not critical. In preparing the mixture according to the invention the mixing ratio will in any individual case be adapted to the range for the intended use.

It is precisely the procedure according to the invention which allows the desired spectrum of properties of the hardened silicone coating composition to be varied over a wide range. Increasing the resin content leads to an increasingly rigid coating composition having a short elongation at break, a high modulus of elasticity and a high tensile strength and being suitable, for example, for coatings. A low resin content produces coating compositions having a long elongation at break, a low modulus of elasticity and a low tensile strength.

The solids contents of the two separately prepared emulsions and the solids content of the mixture of the two separately prepared emulsions are not critical. Either the later-desired solids contents are taken into account in the preparation, or the desired solids content is subsequently brought about by concentrating or diluting the mixture. If it is desired to use the mixture as a sealant, the solids content is preferably high. Furthermore, the mixture according to the invention can additionally be made mechanically stable by stirring in fillers, which is necessary in particular in the case of the abovementioned use as a sealant.

Suitable catalytically active substances are those which are described in the literature for condensation and transesterification reactions. It is preferred to add to the mixture according to the invention of two separately prepared silicone emulsions an emulsion of an agent which promotes the subsequent adhesion to a substrate or the subsequent hardening, for example alkyltin salts. In the preferred embodiment, the mixture according to the invention of emulsions can thus be mixed with an emulsion of an alkyltin salt immediately after the preparation. However, it is also possible to add a hardening agent emulsion immediately before the desired application.

Suitable additives of this type are for example the known alkyltin salts, such as, for example, dibutyltin dilaurate, dialkyltin distearate, dialkyltin dioctomaleinate, dialkyltin maleate and the like.

The silicone emulsion mixtures according to the invention are chiefly used for preparing impregnations and coatings.

They are suitable, for example, for coating plastics such as, for example, polyurethane, wood, masonry and so on. They are stable to weathering, hide even cracks in the support material, and render the surface water-repellent. Even fabrics of any type can be finished with these emulsions.

It is, furthermore, possible, by stirring fillers into the emulsion mixtures according to the invention, to obtain non-flowing emulsions which can be used as grouting compositions. For this purpose emulsions preferably have a solids content of about 60% or higher. The fillers are silicas, which can be of natural origin or which can be produced pyrogenically or precipitated, and/or other especially finely divided fillers, such as, for example, dolomites or precipitated chalks. The critical factor is an adequate thixotropic effect which makes it possible to extrude the pastes without great expenditure of force and, nevertheless, to use the pastes on vertical joints. The silicas used can be materials having a (BET) surface area of between about 50 m²/g and 300 m²/g. The further non-thixotropic fillers used can be various types of chalk which are primarily used to bring down the price of the paste. Examples of other fillers are types of carbon black, titanium dioxide, clays, aluminum oxide, quartz, plastic pastes, zinc oxide or mica and, if appropriate, pigments.

It is also possible to stir into the composition according to the invention further additives such as have been described to date for materials of this kind, for example trimethylsiloxypolydimethylsiloxanes, organic plasticizers or extenders, defoamers, adhesion promoters, fungicides or other biologically active ingredients, and fragrant substances, and, if appropriate, these components are added in the form of emulsions.

The subject-matter of the present invention will now be explained in more detail by reference to examples (%ages refer to %ages by weight, unless stated otherwise).

EXAMPLE 1

Preparation of an emulsion of a long-chain OH—terminated silicone oil 1.5 kg of sodium n-alkylsulphonate and 1.5 kg of POE (5) lauryl alcohol are each individually dissolved in 1.5 kg of water. Then the mixture of the two emulsifier solutions is mixed with 1.5 kg of sulphonic acid and 56 kg of water. 35 kg of octamethylcyclotetrasiloxane are stirred into the aqueous phase by means of a high-speed stirrer. The preemulsion is homogenized 2 x under 200 bar by means of a high-pressure emulsifying machine. The emulsion is stirred at 80° C. for 2 hours and then at 60° C. for 24 hours.

When the emulsion has cooled down to room temperature, it is neutralized with 1.5 kg of a 50% strength aqueous triethanolamine solution. The result is 100 kg of a stable emulsion having a solids content of about 40% (determined in accordance with DIN 53,182).

EXAMPLE 2

Preparation of a methylmethoxy resin 10 moles of methanol are mixed with 5.5 moles of water and the mixture is slowly added dropwise, by means of a dropping funnel, at a starting temperature of 30° C., to a mixture of 6 moles of methyltrichlorosilane and 400 g of xylene which is thoroughly stirred in a three-necked flask. Gaseous HCl escapes through the attached condenser. The reaction mixture cools down rapidly. After addition of the aqueous methanol solution the reaction mixture is heated to 40° C., and a mixture of methanol and HCl is distilled off in vacuo. Residual HCl is neutralized with anhydrous sodium carbonate, and the solvent is then distilled off under 30 mbar up to a bottom temperature of 135° C. Cooling and filtration produces a clear colorless liquid having a viscosity of 50 mPa.s at 25° C. The composition of the methylmethoxysilicone resin thus prepared corresponds to the overall formula $CH_3Si(O)_{1.1}(OCH_3)_{0.8}$.

EXAMPLE 3

Emulsification of the methylmethoxysilicone resin prepared under 2

0.9 kg of sodium carboxymethylcellulose is stirred into 55.1 kg of water at room temperature. The mixture is stirred for 4 hours until a homogeneous mixture has formed. 3.2 kg of polyoxyethylene (40) triglyceride and 0.8 kg of polyoxyethylene (2) oleyl alcohol are successively added and stirred into the mixture. 40 kg of the resin prepared in Example 2 are metered in over 30 minutes. The mixture is stirred with a high-speed stirrer for a further 20 minutes. It is homogenized 5 times under 200 bar by means of a high-pressure emulsifying machine.

The emulsion thus prepared is stable for longer than 6 months, despite the high alkoxy content of the alkoxy-functional, low molecular weight silicone resin.

EXAMPLE 4

Mixing of the emulsions prepared in Example 1 and Example 3

20 kg of the emulsion of Example 1, 20 kg of the emulsion of Example 3 and 3 kg of a 10% strength emulsion of dibutyltin dilaurate in water are stirred with one another for 1 hour.

The mixture thus prepared is stable for longer than 6 months.

EXAMPLE 5

Application data for a coating prepared from the emulsion of Example 4

(Emulsion is distributed on a substrate in the form of a thin film and left to dry)

Physical properties in accordance with DIN 53,504

| Elongation at break | 185% |
|---|---|
| Modulus of elasticity (100%) | 0.75 [MPa] |
| Tensile strength | 0.81 [MPa] |

EXAMPLE 6

Preparation of a 60% emulsion of a long-chain OH—terminated silicone oil 1,800 g of octamethylcyclotetrasiloxane and 40 g of dodecylbenzenesulphonic acid are mixed together with stirring. 1,200 g of deionized water are then added. The entire batch is stirred at room temperature for 1 hour and is then twice homogenized under 200 bar by means of a high-pressure emulsifying machine.

A further 40 g of dodecylbenzenesulphonic acid are then added, and the mixture is heated to 85° C. The mixture is stirred at 85° C. for 2 hours, is then allowed to cool down to 60° C., and is stirred at this temperature for 72 hours. After cooling down to room temperature it is neutralized by the dropwise addition of a 50% strength triethanolamine solution.

EXAMPLE 7

Preparation of a 60% strength emulsion of the low molecular weight alkoxy-functional silicone resin of Example 2.

17 kg of water are heated to 60° C. with stirring. 2.4 kg of polyoxyethylene triglyceride and 0.6 kg of POE (2) oleyl alcohol are added in succession at 60° C. After switching off the heating device, 30 kg of the alkoxy-functional silicone resin of Example 2 are then added dropwise in the course of κ hour. The mixture is then stirred for 15 minutes and homogenized 9 x under 200 bar by means of a high-pressure emulsifying machine.

EXAMPLE 8

Preparation of a sealant 25.7 kg of the emulsion of Example 6, 3.2 kg of the emulsion of Example 7 and 0.6 kg of a 10% strength emulsion of dibutyltin dilaurate are stirred with one another for 1 hour. The following are successively stirred into this mixture:
6.5 kg of Omya BLR 3 chalk
1.7 kg of pyrogenic silica having an average BET surface area of 300 m$^2$/g Physical properties of the non-tacky test specimens in accordance with DIN 53,505 and DIN 53,504

| Shore A hardness | 25 |
| --- | --- |
| Modulus of elasticity (100%) | 0.25 [MPa] |
| Tensile Strength | 0.32 [MPa] |
| Elongation at break | 340% |

EXAMPLE 9

Preparation of 40% resin emulsion 56 kg of water are heated to 60° C. with stirring. 3.2 kg of polyoxyethylene (40) triglyceride and 0.8 kg of polyoxyethylene (2) oleyl alcohol are stirred in, in succession, as emulsifiers. 36 kg of the resin produced in Example 2 and 4 kg of γ-glycidyloxypropyltrimethoxysilane are mixed together with stirring and added simultaneously to the aqueous emulsifier solution over a period of 30 minutes. The mixture is stirred for a further 30 minutes and then homogenized 9 times at 200 bars.

EXAMPLE 10

Preparation of a sealant 30.9 kg of the emulsion from Example 6, 1.5 kg of the emulsion from Example 9 and 0.7 kg of a 10% emulsion of dioctyl tin maleinate are mixed together for 1 hour with stirring. The following are stirred into this mixture, in succession:
0.1 kg of a 30% silicone defoaming emulsion
8.1 kg of chalk: Omya BLR 3
0.1 kg of a 30% silicone defoaming emulsion
1.8 kg of pyrogenic silicic acid having an average BET surface area of 150 m$^2$/g.

Physical properties of the non-tacky test specimens according to DIN (German Industrial Standards) 53505 and 53504.

| Shore A hardness | 22 |
| --- | --- |
| Modulus of elasticity (100%) | 0.302 [MPa] |
| Tensile Strength | 0.962 [MPa] |
| Elongation at break | 670% |

It will be appreciated that the instant specification and examples are set forth by way of illustration and not limitation, and that various modifications and changes may be made without departing from the spirit and scope of the present invention.

We claim:

1. A silicone emulsion which can be converted into an elastomeric product under ambient conditions by eliminating and evaporating water and alcohol or carboxylic acid, comprising by weight approximately
   (A) 100 parts of a hydroxyl-terminated polydiorganosiloxane having a molecular weight of at least about 50,000,
   (B) 1–400 parts of a low molecular weight, reactive acyloxy- or alkoxyfunctional silicone resin,
   (C) 0.1 to 20 parts of a catalytic compound,
   (D) 0 to 200 parts of a thixotropic filler and
   (E) 0 to 200 parts by weight of a non-thixotropic filler, the silicone emulsion having a solid content of about 20 to 85% by weight.

2. An emulsion according to claim 1, comprising by weight approximately
   (A) 100 parts of a hydroxyl-terminated polydiorganosiloxane having a molecular weight of at least about 50,000,
   (B) 50 to 400 parts of a low molecular weight alkoxyfunctional silicone resin,
   (C) 0.1 to 20 parts of an alkyltin salt, and
   (D) 0 to 20 parts of a thixotropic filler, the total mixture having a solid content of about 30 to 60% by weight.

3. An emulsion according to claim 1, comprising by weight approximately
   (A) 100 parts of a hydroxyl-terminated polydiorganosiloxane having a molecular weight of at least about 50,000,
   (B) 50 to 200 parts of a low molecular weight alkoxyfunctional silicone resin,
   (C) 0.1 to 10 parts of an alkyltin salt, and
   (D) 0 to 20 parts of a thixotropic filler, the total mixture having a solid content of about 30 to 50% by weight.

4. In the coating of a surface with a silicone composition, and drying, the improvement which comprises employing as the silicone composition an aqueous emulsion, containing an alkoxyfunctional silicone resin, according to claim 1.

5. An emulsion according to claim 1, comprising by weight approximately
(A) 100 parts of a hydroxyl-terminated polydiorganosiloxane having a molecular weight of at least about 50,000,
(B) 1 to 90 parts of a low molecular weight alkoxy-functional silicone resin,
(C) 0.1 to 20 parts of an alkyltin salt,
(D) 2.5 to 200 parts of a thixotropic filler, and
(E) 0 to 200 parts of a non-thixotropic filler, the total mixture having a solid content of about 60 to 85% by weight.

6. An emulsion according to claim 1, comprising by weight approximately
(A) 100 parts of a hydroxyl-terminated polydiorganosiloxane having a molecular weight of at least about 50,000,
(B) 4 to 40 parts of a low molecular weight alkoxy-functional silicone resin,
(C) 0.1 to 10 parts of an alkyltin salt,
(D) 2.5 to 200 parts of a thixotropic filler, and
(E) 20 to 200 parts of a non-thixotropic filler, the total mixture having a solid content of about 60 to 85% by weight.

7. In the joinder of a material to another material employing a sealant, the improvement which comprises employing as the sealant an aqueous emulsion, containg an alkoxyfunctional silicone resin, according to claim 1.

8. The process for preparing a silicone emulsion according to claim 1, comprising mixing an aqueous emulsion of the hydroxyl-terminated polydiorganosiloxane with an aqueous emulsion of the alkoxy-functional silicone resin, the catalyst and fillers if present being added to either of the individual emulsions or the mixture.

9. The process according to claim 8, wherein the aqueous emulsion of the hydroxyl-terminated polydiorganosiloxane is produced by polymerizing a diorganosiloxane in water in the presence of a catalyst and an emulsifying agent.

10. The process according to claim 8, wherein the alkoxyfunctional silicone resin is produced by reacting an alkylchlorosilane with an alkanol and water, and is emulsified in water afterwards.

* * * * *